United States Patent [19]

Kinoshita

[11] Patent Number: 5,006,868

[45] Date of Patent: Apr. 9, 1991

[54] METHOD AND APPARATUS FOR PRINTING TWO OR MORE COLORS USING AN ELECTROPHOTOGRAPHIC PROCESS

[75] Inventor: Koichi Kinoshita, Shizuoka, Japan

[73] Assignee: Kentek Information Systems, Inc., Allendale, N.J.

[21] Appl. No.: 443,246

[22] Filed: Nov. 28, 1989

[51] Int. Cl.5 .................... G03G 15/01; G01D 9/42; G01D 15/14

[52] U.S. Cl. .............................. 346/157; 346/108; 346/160

[58] Field of Search ..................... 346/157, 160, 108

[56] References Cited

U.S. PATENT DOCUMENTS

| | | | |
|---|---|---|---|
| 2,584,695 | 2/1952 | Good . | |
| 2,752,833 | 7/1956 | Jacob . | |
| 2,879,397 | 3/1959 | Lehmann . | |
| 2,962,734 | 11/1960 | Dessauer . | |
| 4,613,877 | 9/1986 | Spencer et al. | 346/160 |
| 4,819,028 | 4/1989 | Abe | 346/160 |
| 4,831,408 | 5/1989 | Yoshikawa et al. | 346/157 |

FOREIGN PATENT DOCUMENTS

| | | |
|---|---|---|
| 54-7337 | 1/1979 | Japan . |
| 59-102257 | 3/1984 | Japan . |

OTHER PUBLICATIONS

R. M. Schaffert, *Electrophotography*, pp. 107–111, (1975), Focal Press Ltd.

*Primary Examiner*—George H. Miller, Jr.
*Attorney, Agent, or Firm*—Marmorek, Guttman & Rubenstein

[57] ABSTRACT

A process for single-pass multi-color electrophotographic printing comprising the steps of forming first and second electrically charged oppositely polarized, latent images on a dielectric-covered photoconductive printing. First and second toners, oppositely charged and differently colored are applied to the first and second latent images, forming first and second toned images having different colors and different polarities. The toned images are then similarly charged and transferred to a print medium.

14 Claims, 4 Drawing Sheets

METHOD AND APPARATUS FOR PRINTING TWO OR MORE COLORS USING AN ELECTROPHOTOGRAPHIC PROCESS

FIELD OF THE INVENTION

The present invention relates to a process and an apparatus for electrophotographic printing of an image in one or more colors in a single rotation of a photoconductive drum or belt. The image may be generated by an LED array or a laser image generator as in a computer driven output printer. More particularly, the invention is a method and apparatus for generating at least two electrostatically distinguishable latent images, developing the two latent images with electrostatically (and color) differentiated toners and transferring both developed images onto a print medium, all in a single rotation of the photoconductive member.

BACKGROUND OF THE INVENTION

In the process of electrophotographic or xerographic printing, a photoconductive member is employed to record an image. Illustratively, the photoconductive member, in the form of a belt or a drum, is charged to a substantially uniform potential to sensitize its photosensitive surface. In the case of a copying machine, a light source illuminates an original document to be copied Through the use of lenses, mirrors, and various other optical components, the charged portion of the photoconductive surface is exposed to a reflected light image of the original document to be reproduced. The photoconductive surface exposed to the light becomes conducting and its potential is reduced; the unexposed surface, i.e., the line - or print - covered part of the image, remains non-conducting and its potential is unchanged In this way the light image is recorded as an electrostatic latent image on the photoconductive member.

In the case of an electrographic printer connected to a computer, a similar process is used to record information on the photoconductive member The charged portion of the photoconductive surface is exposed to a light image produced by an optical print head. The precise shape of the light image is controlled by input signals from the computer For example, a laser or an LED array may be used as an optical print head which receives input signals from the computer to illuminate the photoconductive member with a light image of a particular shape. Here too, an electrostatic latent image corresponding to the desired information areas is recorded on the photoconductive member as areas of higher and lower potential.

A variation of the foregoing process utilizes a photoconductive member covered with a thin, transparent insulating layer; this is the basis for the Katsuragawa electrophotographic process which is described below.

In the Katsuragawa process, the basic photoconductive member is a three layer sandwich comprising a conductive substrate, a photoconductive layer, and a thin transparent dielectric layer covering the photoconductive layer. The steps involved in forming the electrostatic image by this process are: (1) corona charging to produce a surface potential of one polarity on the photoconductive member, (2) reverse polarity corona charging simultaneous with image exposure, and (3) overall uniform illumination. As a result of the above steps, the final latent electrostatic image resides on the surface of the dielectric layer and the field within the photoconductive layer is reduced to zero. From this point on, the operational steps are the same as in xerography: development of the latent electrostatic image with toner, transfer of the toner image to paper, fixing the toner on the paper and cleaning of the drum to prepare for the next cycle.

After recording the electrostatic latent image on the photoconductive member, whether by standard xerographic techniques or by the Katsuragawa process, the latent image is developed by bringing charged developer material or toner into contact with it. The charged developer material is attracted to the information areas of the electrostatic latent image and forms a developed or powder image on the photoconductive member corresponding to the electrostatic latent image. The powder image is subsequently transferred to a sheet of recording medium, such as a sheet of paper, in a transfer region. Thereafter, the powder image is permanently affixed to this sheet by a variety of methods, the most common of which is by fusing.

As the above-described processes utilize only one toner station, the image is printed in one color only, that is, the color of the toner which, most commonly, is black. It is evident that in order to achieve a multi-color print, a variety of toners must be used, each having a different color and each forming a corresponding portion of the image.

Several approaches to the implementation of multicolor electrographic printing can be found in the prior art. U.S. Pat. No. 2,584,695 to P.J. Good teaches a method of successive scanning of an original document under different color light filters, and successive printing on the print medium in each different color. Each color requires an individual scan so this process is a repetition of the single color process for each color.

U.S. Pat. No. 2,752,833 to C.W. Jacob also teaches a process for multi-color electrographic printing which is a repetition of the single color process for each color. In this process, a three gun cathode ray tube generates three images of an object scanned through three colored filters. The image patterns formed on the face of the CRT are directed via lenses and mirrors to three different areas of the interior of a photoconductive drum. A print medium is wrapped around the outside of the drum. Three successive images are formed on the drum, as it rotates. Following formation of each image there is a development and print cycle in each of the three different colors. This method is similar to the previous method insofar as it depends on the sequential repetition of the single color process.

A different approach is taught in U.S. Pat. No. 2,962,374 to J.H. Dessauer. This method employs a multi-layer photoconductive medium, where the first layer responds to a first color and transmits the remaining colors; the next layer responds to a second color and transmits the remaining color; and the last layer responds to the last color. The three photoconductive layers are developed separately and the images are superimposed in the printing steps which occur sequentially.

All of the aforementioned methods of electrophotographic printing are subject to the problems of resolution and registration inherent in the process of forming, developing and superimposing several different color component images in order to create one multi-colored composite image.

U.S. Pat. No. 2,879,397 to E.H. Lehmann relates to a dual development procedure of electroradiographic latent images. These latent images are formed when x-ray patterns are projected on a recording device made of materials whose electrical conductivity is altered by exposure to penetrating radiation such as x-rays and gamma-rays. The patent teaches successive development steps, in the first of which development is carried out in a gas suspension of particles of one color and electrical polarity, followed by a second development step in a gas suspension of particles of contrasting color and opposite polarity. This results in a two color image with enhanced detail in all developed image areas.

Japanese Patent Disclosures 54-7337 and 59-102257 both disclose copying machines which employ the Katsuragawa process.

Japanese Patent Disclosure Document 59-102257 teaches a 2-color copying apparatus which employs the Katsuragawa process. The image to be copied may be viewed as comprising black and blue regions, red regions, and yellow and white regions. The copier disclosed in the aforementioned Japanese patent document employs a photoconductive member comprising a conductive substrate, a photoconductive layer on top of the conductive substrate, and a thin transparent insulating layer on top of the photoconductive layer. The photoconductive member is insensitive to blackness (i.e., the absence of light) and to blue light, but is sensitive to red, yellow, and white light. The 2-color copying process disclosed in the Japanese patent document works in the following manner. Initially, a first electric charging device applies a uniform electrostatic charge of a given polarity to the surface of the photoconductive member. Next, a second electric charging device of opposite polarity is applied to the photoconductive member while simultaneously a first reflected light image lacking a certain color (e.g., red) due to filtering is projected onto the photoconductive member to form a first latent electrostatic image. This first latent electrostatic image corresponds to the yellow and white regions of the image to be copied since the photoconductive member is insensitive to black and blue, while red has been filtered out. Next, the photoconductive drum is irradiated with a reflected light image of the color (e.g., red) which was removed from the first light image to form a second latent electrostatic image. This second latent electrostatic image corresponds to the red regions of the image to be copied. Thus, there are now three distinct types of regions on the photoconductive member. A first type of region corresponds to the blue and black regions of the image to be copied, a second type of region corresponds to the white and yellow regions of the image to be copied and forms a first latent electrostatic image, and a third type of region corresponds to the red regions of the image to be copied and forms a second latent electrostatic image.

Next, the second latent electrostatic image corresponding to red regions is developed with a red toner. Thereafter, the photoconductive member is subjected to an overall charging process followed by uniform illumination. Subsequently, the regions on the photoconductive member corresponding to the black and blue regions of the image to be copied are developed, e.g., with a black toner, while the first latent electrostatic image corresponding to the yellow and white regions of the image to be copied remains undeveloped. Finally, the two separate developed images (blue-black and red) are transferred to a recording medium and fused thereto. The first (yellow-white) latent image, not having been developed, appears as white on the recording medium.

It should be noted that the toner used in both developing steps has the same (e.g., negative) electrostatic charge. Further, the second developing step (i.e., the development of the non-exposed blue-black regions) is a non-contact step so as not to disturb the previously developed second (red) latent image. It is a significant advantage of the copying process disclosed in the Japanese patent document that the entire two-color copying process can be accomplished during a single rotation of the photoconductive member.

The method and apparatus disclosed in Japanese Patent Disclosure Document 59-102257 are directed specifically to a twocolor copier. As such, the method and apparatus disclosed therein rely upon special devices or techniques for filtering out light of particular colors from an image to be copied in both the first and second irradiations. The method and apparatus disclosed therein are not easily adapted to a xerographic printer which is connected as an output device to a computer or other digital processing unit.

There is nothing in the prior art which shows how a xerographic printer which connects to a computer can be adapted to form a plurality of latent images on a photoconductive member, these latent images being developed into a multi-colored toned image in a single rotation of the photoconductive member.

It is therefore an object of this invention to provide a xerographic printer connected as an output device for a computer or other digital processing unit, which printer produces a plurality of latent images that are developed into a multi-color toned image in a single rotation or "pass" of a photoconductive member in the form of a drum or belt.

It is a further object of this invention to provide an electrophotographic printer which connects to a computer and which utilizes the Katsuragawa process to form a multi-colored toned image in a single rotation of an electrophotoconductive member such as a drum or belt.

SUMMARY OF THE INVENTION

The printer of the present invention utilizes a Katsuragawa type, three-layer photoconductive member comprising a conductive substrate, a photoconductive layer formed on the conductive substrate, and a thin transparent dielectric layer formed on the photoconductive layer. During a single rotation of the photoconductive member, the following steps are illustratively carried out:

(a) The photoconductive member is uniformly charged to a surface potential of a first polarity (e.g., positive).

(b) The photoconductive member is uniformly reverse polarity charged while being selectively exposed by a first light source such as an LED array or laser operative under the control of a computer or other digital processing unit to form a first latent electrostatic image on the photoconductive member. As a result of this step, all regions of the photoconductive member have the same (e.g., negative) surface potential, but in the regions exposed by the light source, the charge is on the dielectric layer only, while in the unexposed regions there is trapped charge in the photoconductive layer. In other words, for the light exposed regions, the effective capacitance is the dielectric layer alone, while for the unexposed regions, the effective capacitance is the dielectric and the photoconductive layer. Because the entire surface layer of the photoconductive member has the same surface potential, the information contained in the first latent image is not now electrostatically distinguishable at the surface of tho photoconductive member, but instead is hidden inside the photoconductive member.

(c) The photoconductive member is selectively exposed by a second light source such as, an LED array or a laser operative under the control of the digital processing unit, to form a second latent electrostatic image on the photoconductive member. A change in potential occurs at the surface of the photoconductive member for the regions exposed to the second latent electrostatic image so that the regions exposed to the second latent image have a positive surface potential while the remainder of the photoconductive member has a negative surface potential.

(d) The second latent electrostatic image is now developed utilizing a negatively charged toner of a first color.

(e) To develop the first latent electrostatic image, it is necessary to electrostatically distinguish between the non-illuminated regions of the photoconductive member and the illuminated areas of the first latent electrostatic image which both now have a negative surface potential. This is accomplished by uniformly illuminating the entire photoconductive member. In this case, the regions not previously illuminated acquire a positive surface potential, while the previously illuminated regions of the first latent electrostatic image remain at a negative surface potential.

(f) The first latent electrostatic image is now developed with positively charged toner of a second color.

(g) Both toners are now charged to a positive potential and then transferred to a recording medium to which the toners are fused, resulting in a two-color image being formed on the recording medium It is a significant advantage of the process described above, that it is carried out in one rotation of the photoconductive member.

BRIEF DESCRIPTION OF THE DRAWINGS

The invention will be described in detail with reference to the accompanying drawings, wherein.

DETAILED DESCRIPTION OF PREFERRED EMBODIMENTS

Figure 1:
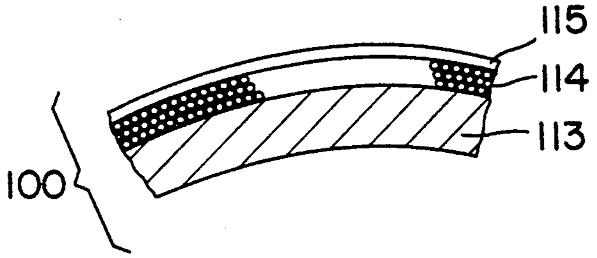
FIG. 1 is a cross-sectional view through the layers of the photoconductive member.

In one of its embodiments, the present invention is a method for multi-color electrophotographic printing in one pass of an electrophotoconductive member 100 such as a drum or a belt. Illustratively, the basic photoconductive member 100 used in this process is a three layer sandwich shown in FIG. 1 comprising a conductive substrate 113, a photoconductive layer 114 and a thin transparent dielectric layer 115.

The light sensitive photoconductive layer 114 is illustratively formed by mixing a fine powder of CdS, an n-type semiconductor, with a plastic binder. A p-type selenium film formed by vacuum deposition may also be used for the photoconductive layer 114. The conducting layer 113 which serves as an electrode may be formed from aluminum. The insulating material 115 should possess adequate mechanical strength and be transparent. Illustratively, the insulating material is a polyester type synthetic resin film, which is joined to the photoconductive layer by coating or adhesion but may also be fitted to the photoconductive layer by heat-shrinkage.

The present invention employs the Katsuragawa process to achieve multi-color electrophotographic printing of images corresponding to data produced by a digital processing unit such as a computer. The method of the present invention is shown in FIGS. *2a–2g*, and comprises the following steps:

Step(a) - the photoconductive member 100 (comprising layers 113, 114, 115) is uniformly charged to a surface potential of a first polarity (e.g., positive) by means of corona charger 420;

Step(b) - reverse polarity corona charging by corona charger 421, simultaneously with first image exposure by light 422 to form a first latent image on the photoconductive member 100;

Step(c) - second image exposure by light 423 to form a second latent image on the photoconductive member;

Step(d) - developing the second latent image by depositing negatively charged toner 424;

Step(e) - uniformly illuminating the photoconductive member 100 by light 425;

Step(f) - developing the first latent image by depositing positively charged toner 426; and Step(g) - positively charging both toners 424 and 426 by means of corona charger 428 resulting in positively charged developed images.

Figure 3:
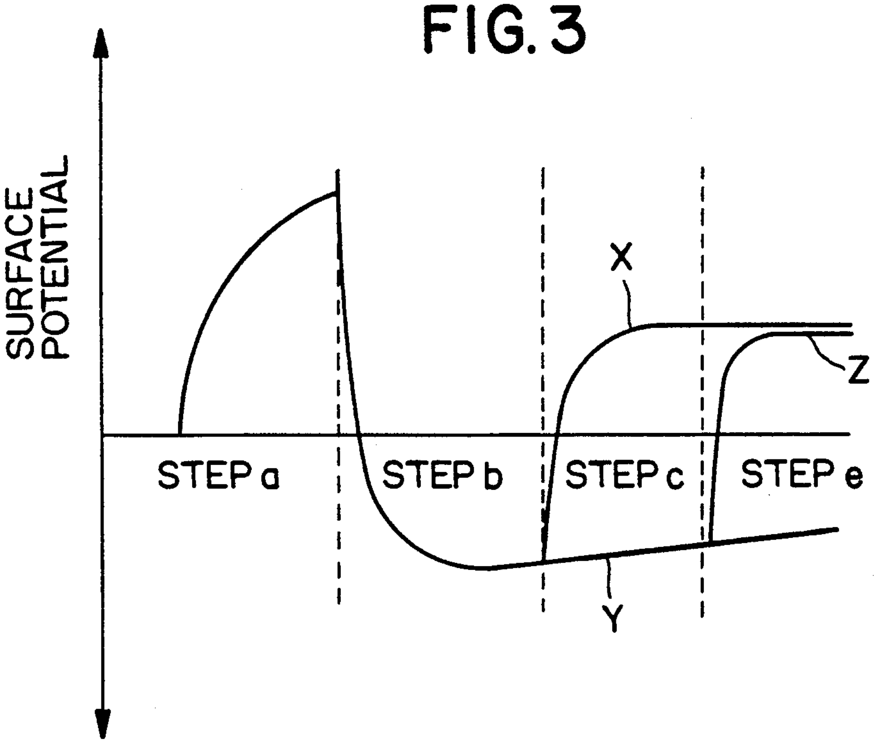
FIG. 3 shows the surface potential of the photoconductive member after the various steps of FIG. 2.

The foregoing steps are described in greater detail below in connection with FIG. 3 which shows the surface potential of the photoconductive member 100 after the various processing steps. The example presented herein is the case where the photoconductive layer 114 comprises an n-type semiconductor such as CdS.

Figure 2A:
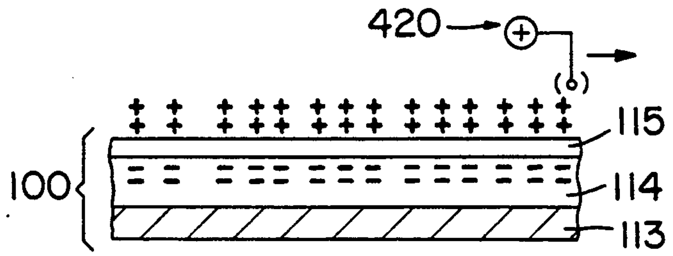
FIG. 2 shows the sequence of steps in forming a two-color image according to the present invention.

In step (a) of the process, shown in FIG. 2*a*, the photoconductive member 100 is uniformly charged by the corona charger 420 to a positive surface potential. This positive surface potential is shown in FIG. 3. The charge distribution induced by this positive charging step is schematically illustrated in FIG. 2*a*. This charge distribution is relatively easy to achieve when the photosensitive layer is formed by mixing CdS powder with a transparent binder. CdS is an n-type semiconductor so that the majority carriers are electrons and the minority carriers are holes. Consequently, the charge distribution of FIG. 2*a* is easier to achieve than a charge distribution of opposite polarity. When the charge distribution of FIG. 2*a* is achieved, the nature of CdS as a strong n-type semiconductor means that its hole density is far less than its electron density so that the capture and binding of electrons in the forbidden band is provoked. Once these electrons are trapped in the forbidden band, significant energy is required to remove them. In some cases, the photoconductive member 100 may also be subjected to uniform illumination before the charging of step (a) so that the charge distribution of FIG. 2*a* is produced more quickly and more uniformly.

Figure 2B:
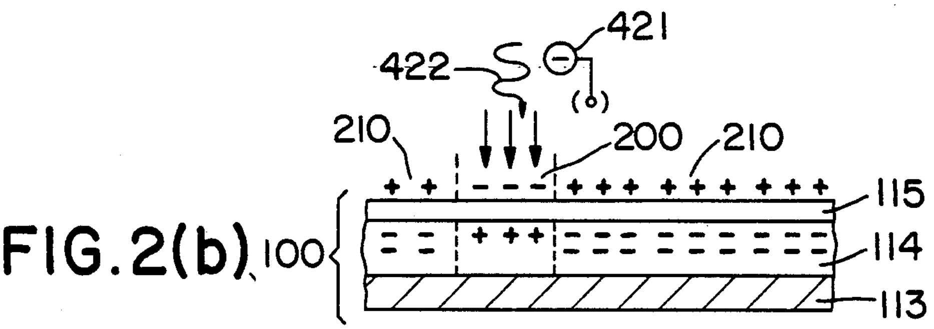

In step (b) shown in FIG. 2*b*, the photoconductive member is simultaneously reverse polarity charged by the corona charger 421 and selectively illuminated by light 422 generated by a first image generator such as an LED array or a semiconductor laser operative under the control of a digital processing unit to form a first latent electrostatic image. Thus, after illumination and reverse polarity charging, as shown in FIG. 2*b*, the photoconductive member 100 comprises two types of regions, the region 200 belonging to the first latent electrostatic image, and the regions 210 which have not been exposed to light.

When the charging capability of the corona charger 421 is sufficient, the surface potential of the regions 200 and 210 is the same. This negative surface potential associated with step (b) is shown in FIG. 3. Sufficient capability by the corona charger 421 is important to stabilize the surface potential of the photoconductive member at a constant value regardless of whether or not a particular region has been illuminated. Examples of suitable corona charging devices for this reverse polarity charging are the so-called grid type corona discharger and the AC-DC type corona discharger. Both of these corona discharger units are described in the above-identified Japanese patent document.

Because both the illuminated regions 200 and non-illuminated regions 210 of the photoconductive member 100 have the same surface potential, the information contained in the first latent electrostatic image does not appear on the surface of the photoconductive member but remains hidden in the charge distribution inside the photoconductive member. In particular, the effective capacitance of the non-illuminated regions 210 is the combined capacitance of the dielectric layer 115 and the photoconductive layer 114, while the effective capacitance of the illuminated regions 200 is that of the dielectric layer 115 alone, because the light radiation removes the trapped charge carriers inside the photoconductive layer 114.

Figure 2C:
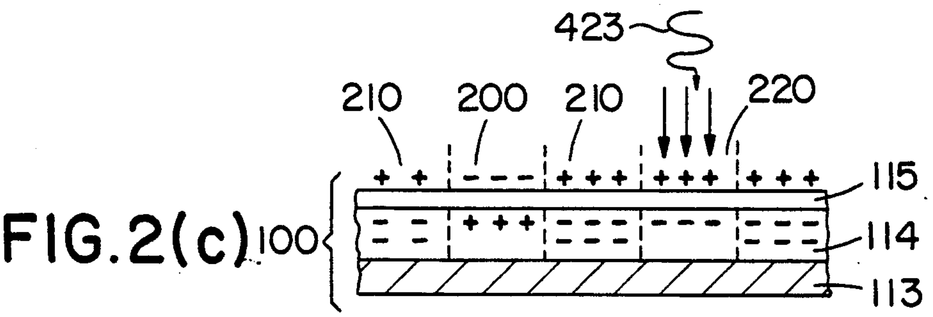

Step (c) of the inventive method, shown in FIG. 2*c*, involves selectively illuminating the surface of the photoconductive member by light 423 generated by a second image generator such as an LED array or a semiconductor laser operative under the control of a digital processing unit to form a second latent electrostatic image on the surface of the photoconductive member. The regions of the second latent electrostatic image are designated 220 in FIG. 2*c*. This second illumination step causes a change in the charge distribution in the photoconductive layer 114 so that the regions 220 of the second latent electrostatic image have a positive surface potential while the non-illuminated regions 200 and the regions 210 of the first latent electrostatic image have a negative surface potential. In FIG. 3 the positive surface potential of the regions 220 of the second latent electrostatic image are designated by X and the negative surface potential of the remaining regions 210 and 200 are designated by Y.

Figure 2D:
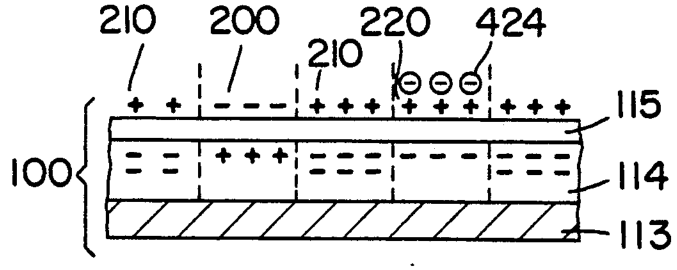

The net result is that the second latent image is now electrostatically distinguishable from the first latent image and the non-illuminated regions. Thus, in step (d), as illustrated in FIG. 2*d*, the regions 220 of the second latent electrostatic image are developed by the toner 424. The toner 424 has a first color and a negative electrostatic charge so that it is attracted to the positive surface potential of the regions 220. Thus, the second latent electrostatic image has been developed.

Figure 2E:
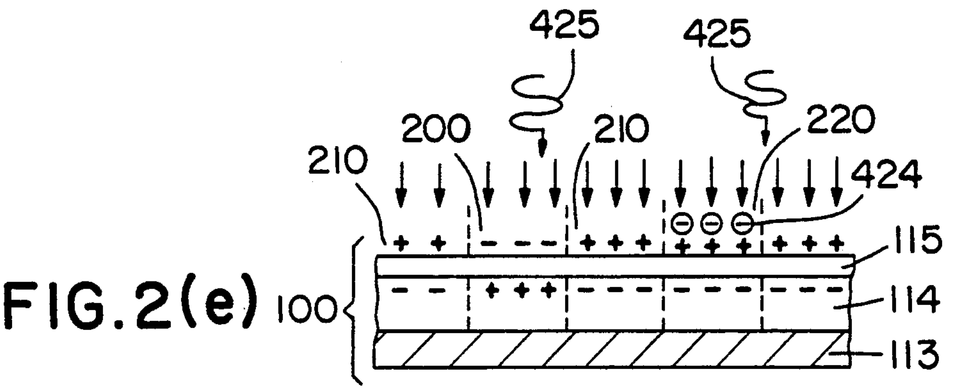

In order to develop the first latent electrostatic image, it is necessary to electrostatically distinguish between the nonilluminated regions 210 and the regions 200 of the first latent image. This is accomplished in step (e) of the inventive process, as shown in FIG. 2*e*, by uniformly illuminating the photoconductive member 100 with the light 425. As a result, the charge distribution in the photoconductive layer 114 is changed so that the previously non-illuminated regions 210 acquire a positive surface potential while the regions 200 of the first latent electrostatic image remain at a negative surface potential. In FIG. 3 the positive surface potential of the regions 210 is designated Z.

Figure 2F:
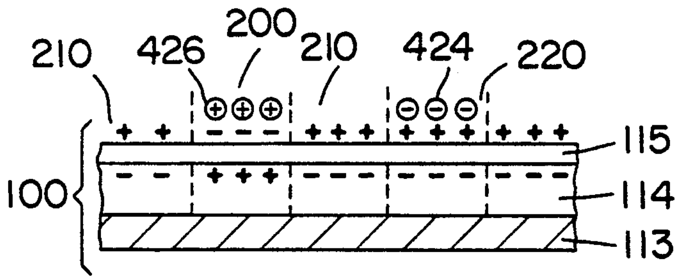

It is now possible to develop the first latent electrostatic image. In step (f) of the inventive method, as shown in FIG. 2*f*, the regions 200 are now developed using the toner 426. The toner 426 has a second color distinct from the color of the toner 424 and a positive electrostatic charge so that it is attracted to the negative surface potential of the regions 200 of the first latent electrostatic image.

Figure 2G:
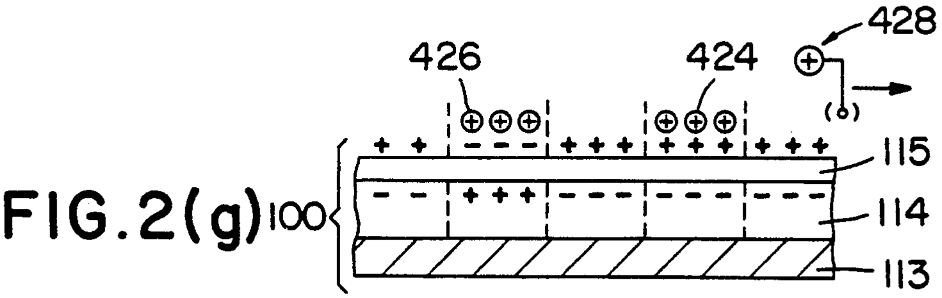

In the foregoing manner first and second distinct electrostatic latent images have been developed with first and second toners. It is now necessary to transfer the developed images to a recording medium such as paper. To accomplish this, it is necessary for the toners 424 and 426 to have the same electrostatic charge. This is accomplished in step (g) of the inventive method, as shown in FIG. 2*g*, by uniformly charging the photoconductor member 100 and both developed images to a uniform, illustratively positive potential using the corona charger 428.

A transfer corona charger (described below in connection with FIG. 4) which is separated from the photoconductive member 100 by the recording medium, transfers the toners 424 and 426 from the photoconductive member to the recording medium. The toners are subsequently fused to the recording medium.

The toners used in this process are illustratively commercially available perfect sphere toners. Perfect sphere toner comprises spherical toner particles approximately 3 to 10 microns in diameter. Ordinary toners are comprised of irregularly shaped particles whose largest dimension is approximately 20 microns. Use of perfect sphere toners is advantageous because it does not agglomerate like ordinary toners. It also provides better resolution than ordinary toner.

Figure 4:
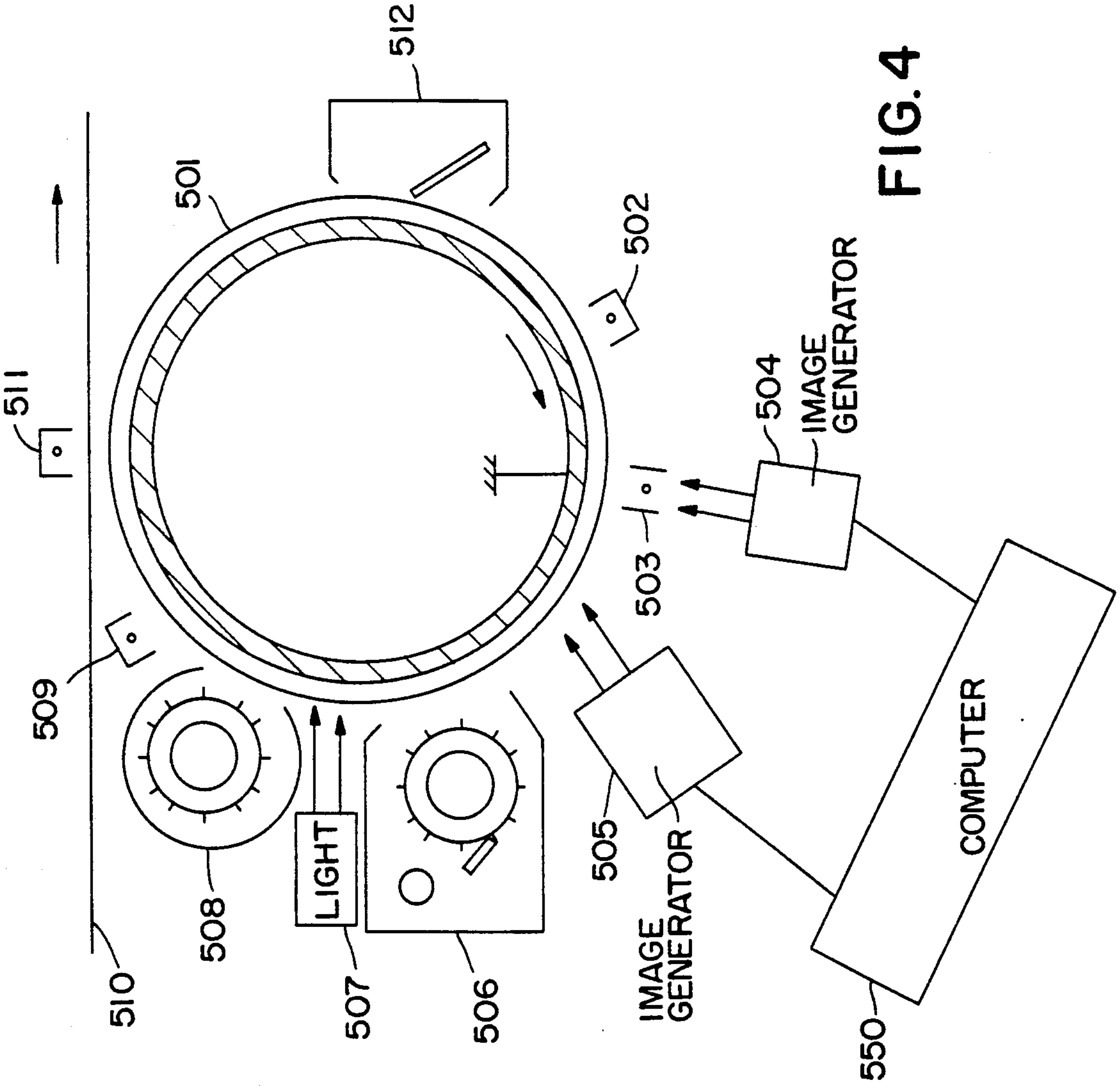
FIG. 4 is a schematic representation of the electrophotographic two-color printing apparatus according to the present invention.

A preferred embodiment of an apparatus for implementing the method of the present invention is shown in FIG. 4.

A photoconductive drum 501 formed from the three-layer photoconductive material of FIG. 1, is encircled, in sequence, by a first corona charger 502, a second corona charger 503, a first image generator 504 co-located with second corona charger 503, a second image generator 505, a first developer unit 506, a uniform exposure light 507, a second developer unit 508, a third corona charger 509 and a transfer corona charger 511. The image generators 504 and 505 operate under the control of a digital processing unit such as computer 550 so that the apparatus of FIG. 4 serves as an output printer for the computer 550. The print medium 510 is shown passing between the photoconductive drum 501 and the transfer corona charger 511. A residual cleaning device 512 prepares the drum 501 for the following printing cycle by stripping off any remaining toner.

The successive steps in the inventive multi-color printing method described above can be followed by referring to FIG. 4. The step (a) involves uniform positive charging of the photoconductive drum 501 by first corona charger 502. This is followed by step (b) which involves reverse polarity charging by second corona charger 503 and simultaneous first latent image formation by means of first image generator 504. Step (c) is second latent image formation by mean of the second image generator 505. Next, in step (d), developer 506 develops the second latent image which has been generated by image generator 505 with negatively charged perfect sphere toner of a first color. In step (e), the surface of the photoconductive drum 501 is uniformly illuminated by means of uniform exposure light 507. Next, in step (f), the second developer unit 508 develops the first latent image by depositing positively charged perfect sphere toner of a second color. At this point, two developed (toned) images are present on the drum 501: one carrying a first color negatively charged toner, and the other carrying a second color positively charged toner. The purpose of step (g) is to prepare for image transfer by charging both toned images to a transfer voltage (e.g. a positive voltage) opposite to the voltage of transfer charger 511. This last charging step is accomplished by corona charger 109. After this the transfer corona charger transfers both images to the print medium 510 and the cleaning unit 512 prepares the drum 501 for the next print cycle.

The foregoing embodiments of the invention have been described as illustrative examples only and are not intended to limit the spirit or scope of the invention.

I claim:

1. A method for printing a two-color image comprising (a) uniformly charging a surface of a photoconductive member to a surface potential of a first polarity, (b) uniformly reverse polarity charging said surface of said photoconductive member while simultaneously selectively exposing said photoconductive member to light generated by a first light source under the control of a digital processing unit to form a first latent electrostatic image on said photocondcutive member, (c) prior to developing said first latent electrostatic image, selectively exposing said photoconductive member to light generated by a second light source under control of said digital processing unit to form a second latent electrostatic image on said photoconductive member, (d) developing said second latent image utilizing a first toner of a first color and having a first electrostatic charge, (e) uniformly illuminating said photoconductive member, and (f) thereafter developing said first latent image utilizing a second toner of a second color and having a second electrostatic charge opposite in polarity to said first electrostatic charge.

2. The method of claim 1 wherein said method further comprises the steps of (g) uniformly charging said photoconductive member after said first and second latent images have been developed so that said toners of said first and second images have an electrostatic charge of the same polarity, (h) transferring said developed latent images to a recording medium, and (i) fixing said images on said recording medium.

3. The method of claim 1 wherein said photoconductive member comprises a conductive substrate, a photoconductive layer formed on said substrate, and an insulating layer formed on said photoconductive layer.

4. The method of claim 2 wherein said digital processing unit is a computer.

5. A method for printing a two-color image under the control of a digital processing unit comprising, (a) uniformly charging a surface of a photoconductive member to a surface potential of a first polarity, (b) selectively exposing said photocondcutive member to light produced by a first light source operative under the control of said digital processing unit to form a first latent electrostatic image while uniformly reverse polarity charging said surface of said photoconductive member so that said light-exposed and non-exposed regions of said photoconductive member have a surface potential of a second polarity opposite to said first polarity, (c) selectively exposing said photocondcutive member to light produced by a second light source operative under the control of said digital processing unit to form a second latent electrostatic image, the regions of said photoconductive member forming said second latent electrostatic image having a surface potential of said first polarity while the non-exposed regions of said photoconductive member and the regions of said photoconductive member forming said first latent electrostatic image having a surface potential of said second polarity, (d) developing said second latent image utilizing a first toner of a first color, (e) thereafter electrostatically distinguishing between said non-exposed regions of said photoconductive member and said regions of said photoconductive member forming said first latent image by causing said non-exposed regions and said regions of said first latent image to acquire surface potentials of opposite polarities, and (f) developing said first latent electrostatic image utilizing a second toner of a second color.

6. The method of claim 5 wherein said method further comprises the step of transferring said developed images to a recording material.

7. The method of claim 5 wherein said photoconductive member comprises a conductive layer, a light sensitive layer formed on said conductive layer, and an insulating layer formed on said light sensitive layer.

8. The method of claim 5 wherein said electrostatically distinguishing step comprises uniformly illuminating said photoconductive member so that said non-exposed regions of said photoconductive member acquire a surface potential of said first polarity and said regions of said photoconductive member forming said first latent image remain at a surface potential of said second polarity.

9. The method of claim 8 wherein said first toner has an electrostatic charge of said second polarity and said second toner has an electrostatic charge of said first polarity.

10. Apparatus for printing a two-color image comprising:

(a) a photocondcutive member, (b) first charging means for uniformly charging a surface of the photoconductive member to a surface potential of a first polarity, (c) second charging means for reverse polarity charging said surface of said photoconductive member, (d) a digital processing unit, (e) first light generating means operative under the control of said digital processing unit and co-located with said second charging means for selectively illuminating said surface of said photoconductive member to form a first latent electrostatic image on said photoconductive member while said second charging means reverse polarity charges said photoconductive member, (f) second light generating means operative under the control of said digital processing unit for selectively illuminating said surface of said photoconductive member to form a second latent electrostatic image, (g) first developing means for developing said second latent electrostatic image with toner of a first color and having a first electrostatic charge, (h) third light generating means for uniformly illuminating said surface of said photoconductive member, (i) second developing means for developing said first latent electrostatic image with toner of a second color and having a second electrostatic charge opposite in polarity to said first electrostatic charge, (j) third charging means for uniformly charging said photoconductive member including said first and second toners used to develop said second and first latent images, and (k) means for transferring said developed first and second latent images to a recording medium.

11. The apparatus of claim 10 wherein said photocondcutive member comprises a conductive substrate, a light sensitive layer formed on said conductive substrate, and an insulating layer formed on said light sensitive layer.

12. A multi-color electrophotographic printing apparatus comprising a rotatable three-layer photoconductive printing member having a conductive inner layer, a photoconductive middle layer and a transparent dielectric outer layer, said photoconductive printing member being surrounded in sequence by, (a) a first corona charging means for uniformly charging said photoconductive member to a surface potential of a first polarity, (b) a second corona charging means colocated with a first image generating means for simultaneously creating a first latent electrostatic image on said photoconductive member and for reverse polarity charging said photoconductive member, (c) a second image generating means for creating a second latent electrostatic image on said photoconductive member, (d) a first developer means for developing said second latent electrostatic image with toner of a first color and having a fist electrostatic charge, (e) a uniform illumination lamp for uniformly illuminating said photoconductive member, (f) a second developer means for developing said first latent electrostatic image with toner of a second color and having a second electrostatic charge opposite to said first electrostatic charge, (g) a third corona charging means for charging both said first and second developed latent image, and (h) a transfer corona charging means separated from said photoconductive member by a print medium feedpath for transferring said developed latent images to a print medium.

13. The apparatus of claim 12 wherein said first and second image generators comprise an LED array.

14. The apparatus of claim 12 wherein said first and second image generators comprises a laser.

* * * * *